United States Patent [19]

Gallatin

[11] Patent Number: 5,037,121

[45] Date of Patent: Aug. 6, 1991

[54] TOW BAR FOR MULTIPLE TRAILERS

[76] Inventor: Norman W. Gallatin, Box 120, Garrison, Iowa 52229

[21] Appl. No.: 486,288

[22] Filed: Feb. 28, 1990

[51] Int. Cl.$^5$ .............................................. B62D 53/06
[52] U.S. Cl. .................................. 280/426; 280/461.1; 280/493; 280/457
[58] Field of Search ............... 280/408, 426, 492, 442, 280/444, 461.1, 460.1, 411.1, 493, 494, 457

[56] References Cited

U.S. PATENT DOCUMENTS 2,251,656  8/1941  Botelho ............................... 280/457

FOREIGN PATENT DOCUMENTS 0066269  11/1982  European Pat. Off. ............ 280/442

OTHER PUBLICATIONS

Improving the Dynamic Performance of Multitrailer Vehicles: A Study of Innovative Dollies, The University of Michigan Transportation Research Institute, Jul. 1986, pp. 18–19, 41, 49, 110.

Primary Examiner—Charles A. Marmor
Assistant Examiner—Kevin Hurley

[57] ABSTRACT

A new linked articulation (LA) system for the connection of a leading trailer to a following full trailer in the heavy truck field. LA systems including the present invention constrain the front of the following full trailer to a position on an imaginary extension of the leading trailer's centerline. In the prior art devices, a telescoping 'stiffening member' keeps the front portion of the second full trailer on the required line. The present invention uses a rigid and non telescoping tow bar to keep the front of the second trailer on the required line. The tow bar connects the frame of the first trailer to the frame of the second trailer and therefor also does the actual towing.

In both the present invention and the prior art LA systems the front of the second trailer is supported by a steerable axle assembly called a 'dolly'. Where the tongue of the dolly of prior art LA systems serves to steer the dolly and pull the second trailer, the tongue of the dolly of the present invention serves to steer the dolly and also does the necessary telescoping function.

4 Claims, 4 Drawing Sheets

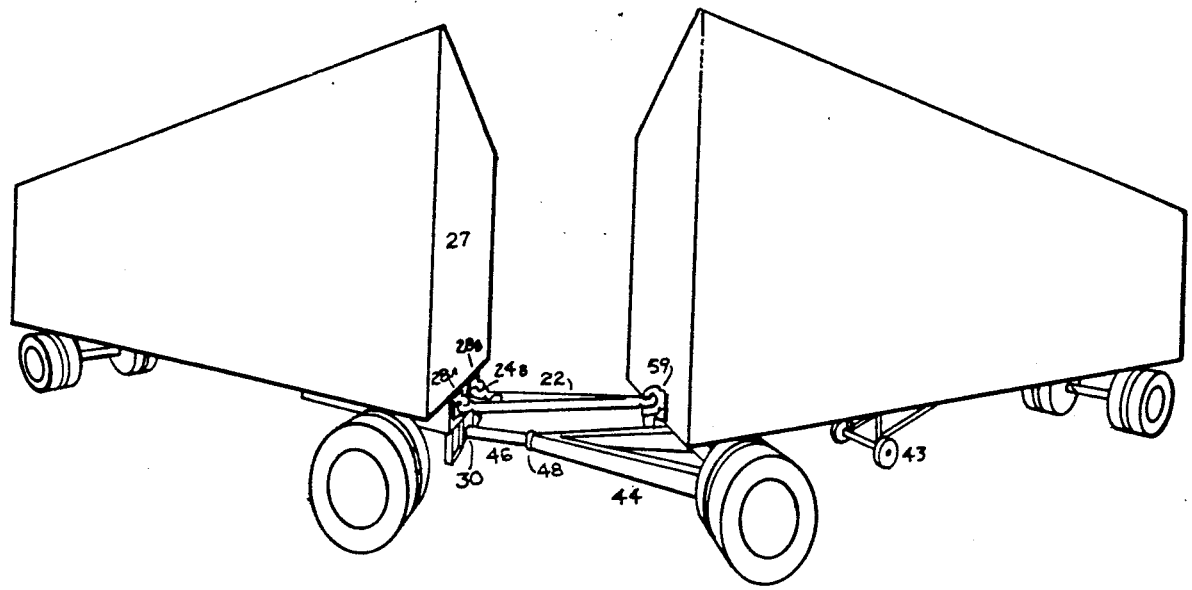

TOW BAR FOR MULTIPLE TRAILERS

FIELD OF THE INVENTION

This invention relates to the connection of large full trailers to leading units such as straight trucks or the trailer portion of tractor and semi trailer combinations. Full trailers are defined here as having at least one non steering axle toward the rear and at least one steering axle toward the front. More particularly, the invention relates to the connection of such full trailers to such leading units by the linked articulation (LA) means.

BACKGROUND OF THE INVENTION AND DISCUSSION OF THE PRIOR ART

In the heavy truck and trailer field, the LA system is much less well known as an alternate to the usual A dolly system (A train) than is the B dolly (B train) system. (Lately these B dolly systems seem to be referred to as 'C dolly' systems, but the older terminology is used here as it is used in the UMTRI reference cited below.) There may be a few thousand B dollys in use in North America, but only about 250 LA dollys are in use here as of now. Nearly 150 of these are in gasoline tanker delivery service in the state of Michigan and another 100 or so are used in tanker service in the Canadian Province of Sasketchewan.

For a description of the geometry and the performance of LA systems in general, refer to the U.S. Pat. No. 4,262,920 of Mettatal, deemed the most pertinate prior art. More important in terms of mathematical analysis and performance details is the UMTRI report: *Improving the dynamic performance of multi-trailer vehicles: A study of innovative dollies*, C. B. Winkler, et. al.

The UMTRI report also discusses the B dolly system which is of interest here for performance and stress level comparisons. Some possible hardware matching between B dolly systems and the present invention are discussed below.

While the UMTRI report does show the B dolly system as the most stable of the alternate dolly systems, it also explains that B dollys are very expensive in dollar cost. Also the B dolly system is very heavy, complex, and introduces large mechanical stresses at the rear of the leading trailer.

Present LA systems offer roughly half of the overall stability improvement over A trains relative to B trains. The stress level introduced into the rear of the leading trailer by a LA dolly is about half that from a B dolly. The present practice LA systems have weight and dollar penalties about a third greater than A trains compared to B trains.

The various cost, weight stress and complexity factors of present LA systems should make them more useful in the continent's doubles and triples fleets than is seen at present. The time consuming and difficult hook up process of the present LA systems is the significant complicating factor of an otherwise simple and relatively inexpensive system. In fact, the present practice LA systems are viewed as useful only with 'married' trailers that are seldom, if ever, disconnected. At present LA is seen only on tanker type service.

The conventional A dolly is of interest here not only for baseline comparison when it is used in an A train, but also because it is part of the present practice type LA systems. Some A dollys are detachable from the second trailer and have fifth wheels, (converter dollys) and others are non detachable (turntable dollys). All present A dollys have a tongue that serves both to steer the dolly and to pull the dolly and second trailer.

Present practice LA systems could be conceptualized as 'a regular A dolly with an additional stiffening member between the bodies of the two trailers'. This stiffening member is articulated for some movement in the pitch axes at two places: the front of the second trailer body and the rear of the first trailer body. The stiffening member is also articulated in yaw at the connection to the front of the second trailer. In function and structure the stiffening member is designed to keep the front portion of the second trailer in line with an extended centerline of the leading trailer. In the present practice LA systems the stiffening member must be telescoping to avoid binding in turns.

Present practice LA systems could be summed up as a telescoping stiffening member used as an accessory to the regular A dolly system. This keeps the front center of the second trailer in line with an imagianary extension of the longitudinal centerline of the leading trailer in turns.

All LA systems including the present invention offer a fixed amount of steering of the dolly for any given angle of articulation of the leading trailer body relative to the second trailer body. Hence the term 'linked articulation'. Some design or experimental effort is required to position the longitudinal location of the articulation points so that side slipping forces are not generated at the tires of the dolly in turning maneuvers.

LA systems including the present invention can be backed in the field as well as B dolly equipped doubles. A train doubles cannot be backed up for any reasonable distance.

A Canadian patent application has apparently been filed recently that modifies the present type LA system to couple the leading and second trailers in roll. The connection of the stiffening member to the front of the rear trailer body will now be coupled in roll while retaining articulation in yaw and pitch. Also the telescoping portion of the stiffening member will have to transmit roll forces between the two trailer bodies.

OBJECTS AND ADVANTAGES OF THE PRESENT INVENTION

The main object of the invention is to provide a LA system that is easy to hook up.

A second object of the invention is to provide a LA system that is lighter in weight and cheaper in dollar cost.

A third object of the invention is to provide a LA system that is suitable for van type trailers with rear opening doors.

Further objects and advantages of the invention will become apparent from consideration of the specification and drawings herein.

SUMMARY OF THE PRESENT INVENTION

The invention described herein is an alternate form of mechanism that creates a LA geometry. The present invention uses an 'A' frame tow bar that directly connects the bodies of the two trailers. This tow bar is of fixed length and does all the actual pulling of the second trailer. The dolly of the present invention can either be detachable or of turntable design. The dolly serves to steer the front wheels and to support the front of the second trailer as with present A trains and LA systems. The dolly tongue of the present invention does not pull the second trailer. Along with the steering function the dolly tongue now serves as the telescoping member.

With this change of the telescoping function from the prior art stiffening member to the dolly tongue, the geometry of the present invention does vary slightly from present practice LA systems. The only significant difference between the two systems occurs when closest possible spacing between the two trailers is desired: Minimum spacing of the two trailers will now be about a foot greater than with present LA systems. The geometric diference in the two LA systems will cause a very slight difference in the track of the second trailer in sharp turns, especially. At road speeds when the two trailers are very nearly in line, the geometric differences become vanishingly small and the present invention will perform virtually identically with existing LA systems.

While the present invention form of LA is essentially the same in performance as existing LA systems, hook up is now relativly simple. Also because of the relative simplicity and lightness of a tow bar, LA is now useful to connect van type trailers with rear opening doors. These details are best explained in the OPERATION AND FUNCTION section.

A BRIEF DESCRIPTION OF THE DRAWINGS

FIG. 1 A perspective view of a prior art stiffening member is shown with the rear of the first trailer.

DETAILED DESCRIPTION OF THE INVENTION FORM AND STRUCTURE

Figure 2:
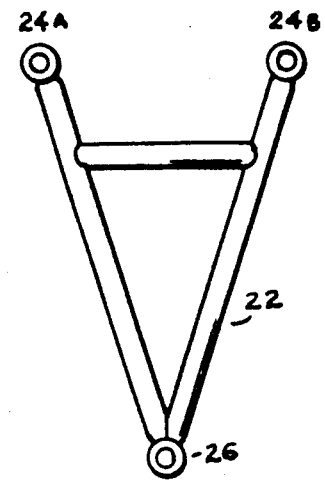
FIG. 2 Shows the tow bar in plan view.

Referring now to FIG. 2, a 'V' shaped tow bar (22) is seen to have draft eyes (24a) and (24b) at the forward end. At the rearward end of the tow bar, another draft eye (26) is seen. This tow bar is fabricated for sufficient strength to both tow the following trailer and to resist the side to side forces of the front of the following trailer.

Figure 3:
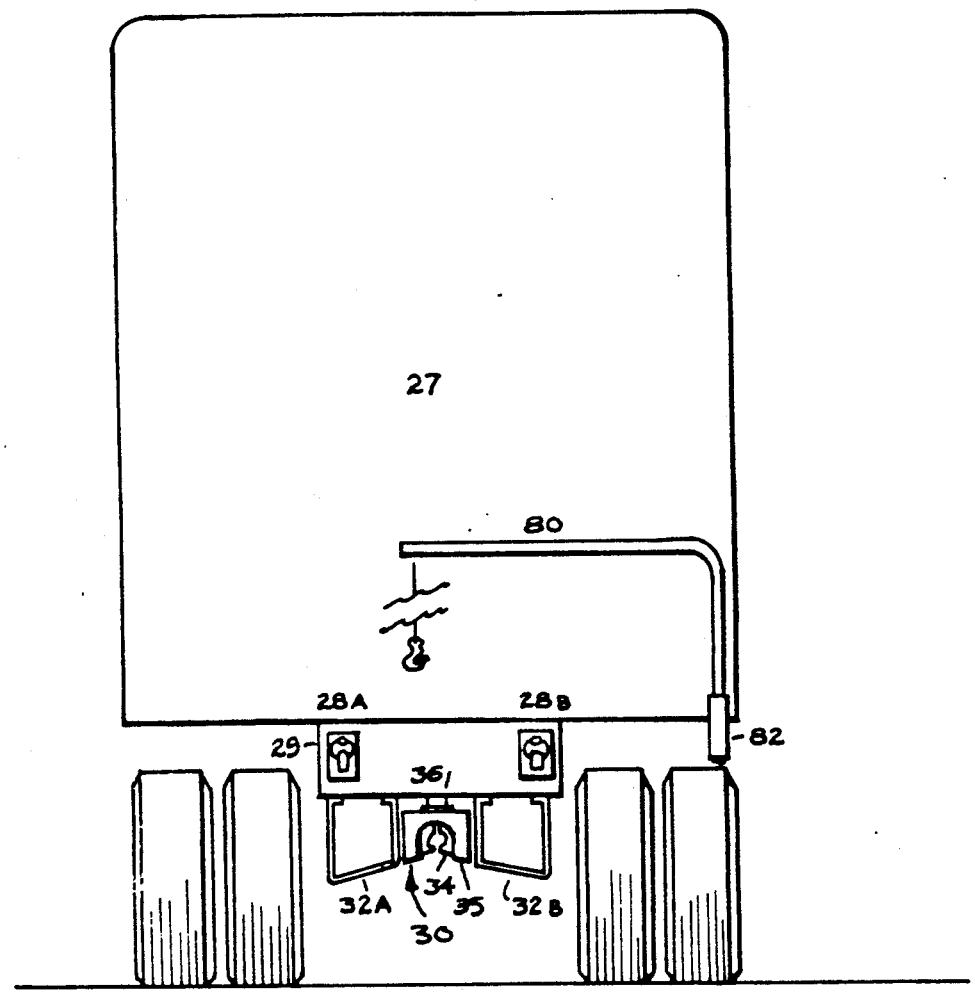
FIG. 3 Shows a rear end view of the leading trailer.

Referring now to FIG. 3, pintle hooks (28a) and (28b) are spaced apart a distance equal to the spacing of the draft eyes (24a) and (24b). These pintle hooks are attached to the rear end of leading trailer (27) at the usual altitude of the paired pintle hooks used for B dolly systems. Actually, no particular height above the roadway or lateral spacing of these pintle hooks is necessary for proper road performance, but a location suitable for the B dollies will allow compatability in fleets with mixed dolly types, and that altitude also makes possible the use of van type trailers. If spacing compatable with B dollies is chosen, then good engineering would suggest that the pintle hook support structure be made strong enough for the heavier B dolly loading. Further, in order to keep lateral lash at the rear end of the tow bar to a minimum, these pintle hooks should have the air operated devices commercially available which reduce free play.

Present LA systems in Michigan use a pair of large bushings that mate with similar bushings on the stiffening member which act together as a very large hinge with a transverse axis. This system of bushings and transverse hinge pins could be adapted to the tow bar of the present invention. A tow bar connected to the lead trailer with such bushings and hinge pin(s) would be effective in terms of weight and reduced lash. Such bushings would need to be specially fabricated and would likely be more difficult to connect than the draft eyes and pintle hooks.

Also shown most clearly in FIG. 3 is a steering tongue guiding assembly (30). Note that the height above the roadway is lower than the rear of the frame members (29) of lead trailer (27). The altitude of the usual A dolly or B dolly pintle hooks tends to be at frame member height for structural reasons. There is no significant longitudinal loading of guiding assembly (30) except for minor loading during hook up operations described in the OPERATION AND FUNCTION section below.

A mechanism similar to guiding assembly (30) is preferred for 'out the bottom' loading and unloading. Jaws (34), housing (35), and guiding rails (32a) and (32b) are some of the components. One way of providing the necessary freedom in yaw necessary for the guiding assembly is to pivot the entire assembly around a rotatable coupling (36). A jaw locking mechanism is necessary and is assumed rather than shown. Jaw locking mechanisms similar to fifth wheel jaw locks are suitable and are familiar to those skilled in the art.

Figure 1:
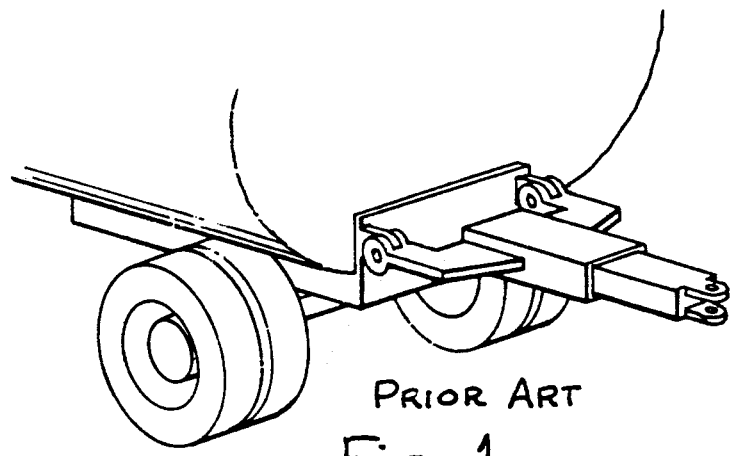
Figures 4, 5:
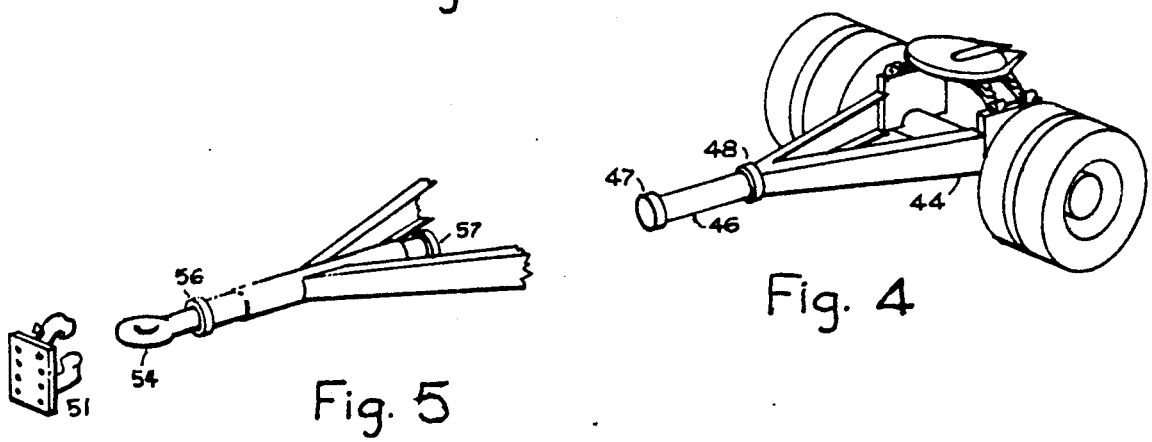
FIG. 4 Shows a dolly tongue suitable for the present invention in a perspective view.
FIG. 5 Shows an alternate dolly tongue suitable for the invention in a perspective view.

The dolly itself (44), seen most clearly in FIG. 4, is a conventional A dolly except for the tongue structure (46). This 'steering tongue' is seen to have a tubular section (46) with collars (47) and (48) defining a working length. When the leading and second trailers are assembled for road travel, tubular section (46) is grasped and located by the guding assembly (30), described above. The forward collar (47) is set to not touch the jaws (34) of guiding assembly (30) in straight ahead driving. The rear collar (48) is set back far enough to not touch jaws (34) at the sharpest possible turning angles of the two trailers. The collars are only used in the loading procedure described later.

The FIG. 4 style dolly would best be manufactured with a slight amount of negative tongue weight. This would facilitate coupling and uncoupling and would insure a slight upward pressure in the jaws of the guiding assembly (30). The entire guiding assembly must be strong enough to resist the downward forces applied to the tongue during braking of a converter style dolly. Other dollies suitable for the invention described below will not need negative tongue weight.

One economical and simple variation of the invention uses a form of commercially available A dolly presently manufactured with adjustable length tongue structure. The telescoping tongue of such a dolly is seen in FIG. 5. The main modification of the dolly for use with the invention is the removal of the mechanism that locks the tongue to a given length. As with the FIG. 4 dolly described above, a front collar (56) and rear collar are added to define a working length. The draft eye coupling means (54) is retained in this version of the invention and a pintle hook (51) is added to the leading trailer (27) at the position of the guiding assembly (30). Depending on the magnitude of forces involved, it is possible that draft eye coupling means (54) and pintle hook (51) could be replaced by the largest ball and socket coupling means as used on middleweight trailers. This FIG. 5 dolly will likely be cheaper and perhaps lighter in weight than a FIG. 4 dolly, but slightly more difficult to hook up.

Another sort of commercially available A dolly has a fifth wheel supported by a pair of transverse leaf springs. When this kind of dolly is hooked up to and is supporting a second trailer, the tongue is self supporting at an altitude predetermined by the manufacturer. When this sort of dolly is set up with a tongue structure (46) seen in FIG. 4, the predetermined tongue altitude should be slightly higher than the guiding assembly (30). When a transverse leaf spring dolly is set up for a FIG. 5 type tongue structure, the draft eye altitude should be slightly lower than the pintle hook. This will provide slight negative and positive tongue weights, respectivly.

Any type of joint connection between the tow bar (22) and the front of the following trailer body (42) is suitable so long as it has enough strength and is articulated in at least yaw and pitch. A modification of the invention with roll coupling at this joint will be described later, but the preferred coupling is the draft eye (26) and a pintle hook (59) or (72). Pintle hook (59) is attached directly to the front of the second trailer (42) if the body structure in that area is strong enough.

Figure 6:
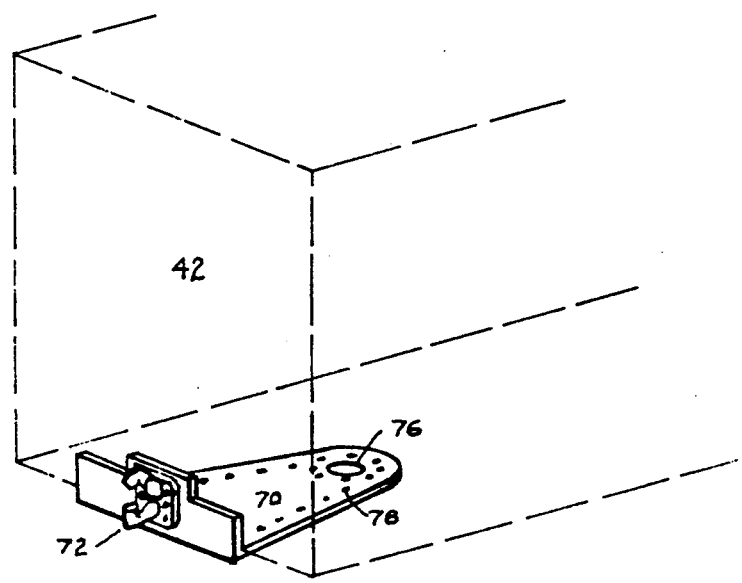
FIG. 6 Shows a perspective view of the underside of an adapter plate mounted to the front of a semi-trailer.

When the body structure of the front center of the second trailer does not have sufficient strength for the various loads of a directly mounted pintle hook, an adapter plate similar to FIG. 6 can be utilized. The adapter plate (70) helps transmit loads from the pintle hook area at (72) back to the area around the second trailer's fifth wheel pin. The hole (76) is provided in the adapter plate for that fifth wheel pin. Mounting holes such as (78) are provided in the adapter plate for screw or welded attachment of the adapter plate (70) to the underside of the front of second trailer (42). This adapter plate will not interfere with a trailer being used as a leading trailer on occasion. Any suitable joint connection to the tow bar (22) may be used at the front of a similar adapter plate.

Figure 7:
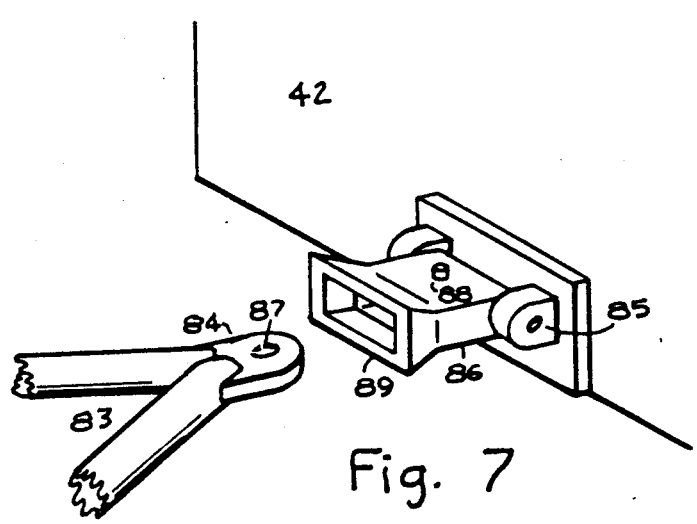
FIG. 7 Shows a perspective view of a tow bar with an alternate coupling mechanism. A partial view of the mating coupler mechanism is also shown.

FIG. 7 shows an alternate pair of connecters for the rear of the tow bar to front of second trailer connection that transmits roll coupling between the bodies of the two trailers. As the loads of roll coupling will be higher than with the simple connections of previously described variations, the various structures will need to be stronger. In particular an adapter plate (70) set up for roll coupling will need extra strength. The bushing and hinge pin variation used on existing LA stiffening members (not shown) may be desirable with a rolled coupled tow bar to avoid transmitting upward loading on one of the pintle hooks (28a) or (28b) when roll forces are being transmitted between the two trailers. Some users will find the slight extra stability of roll coupling worth the extra weight and extra expense.

Tab (84) is seen at the rear of tow bar (83) at a position just ready to mate with socket (86). The flaired opening (89) will help the mating process. Hole (87) and latch pin (88) attach tow bar (83) and rear trailer (42) while allowing yaw movement. Horizontal hinge pins (85) allow some pitch articulation.

Figure 8:
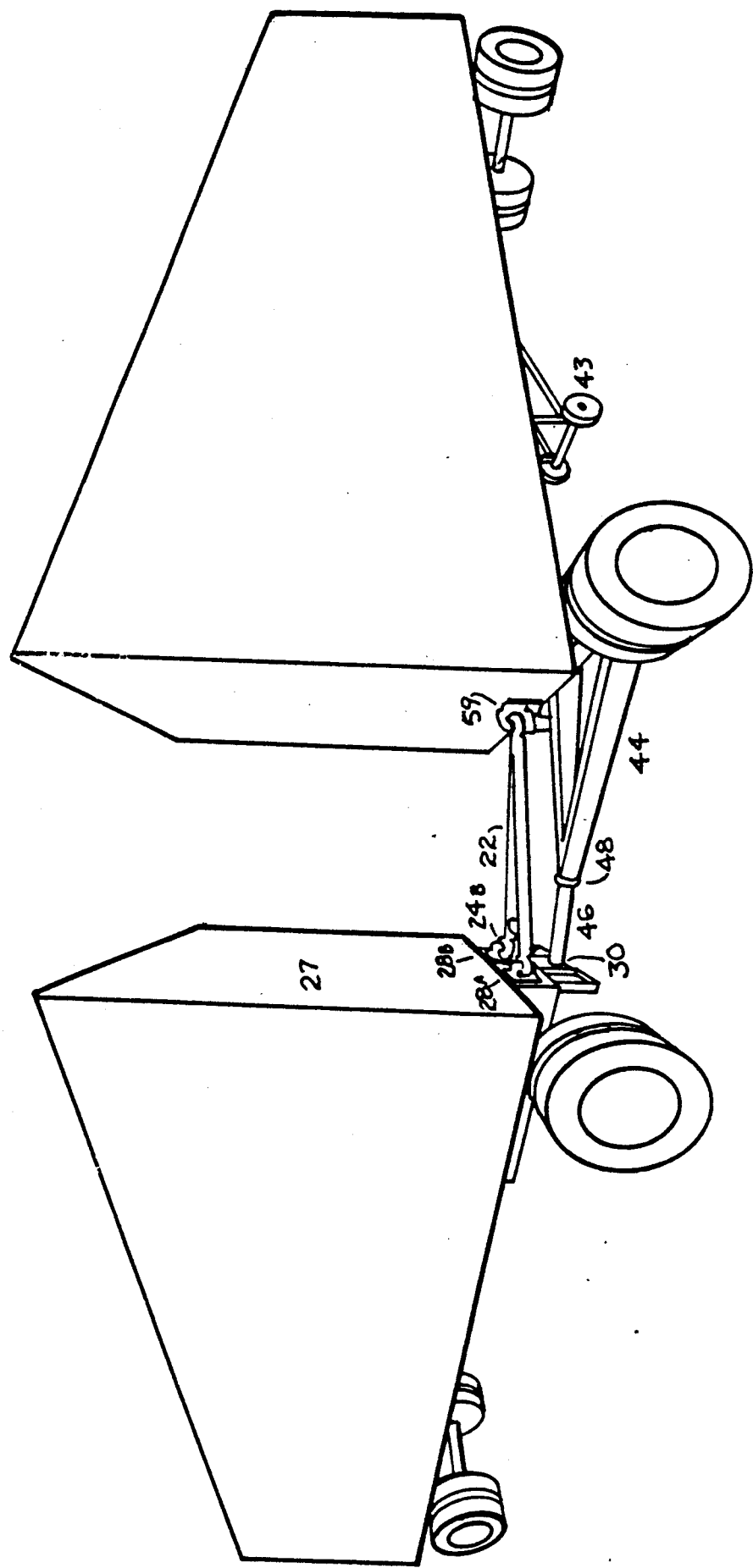
FIG. 8 Is a fisheye lens view in perspective of the assembled components of the invention.
Figure 9:
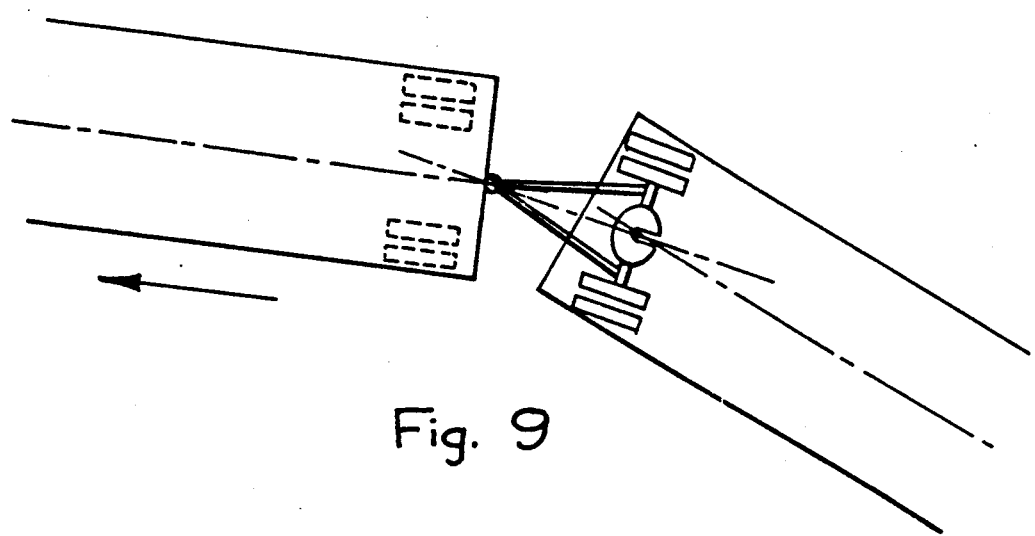
FIG. 9 Shows a plan view of an A train combination vehicle in a turn.
Figure 10:
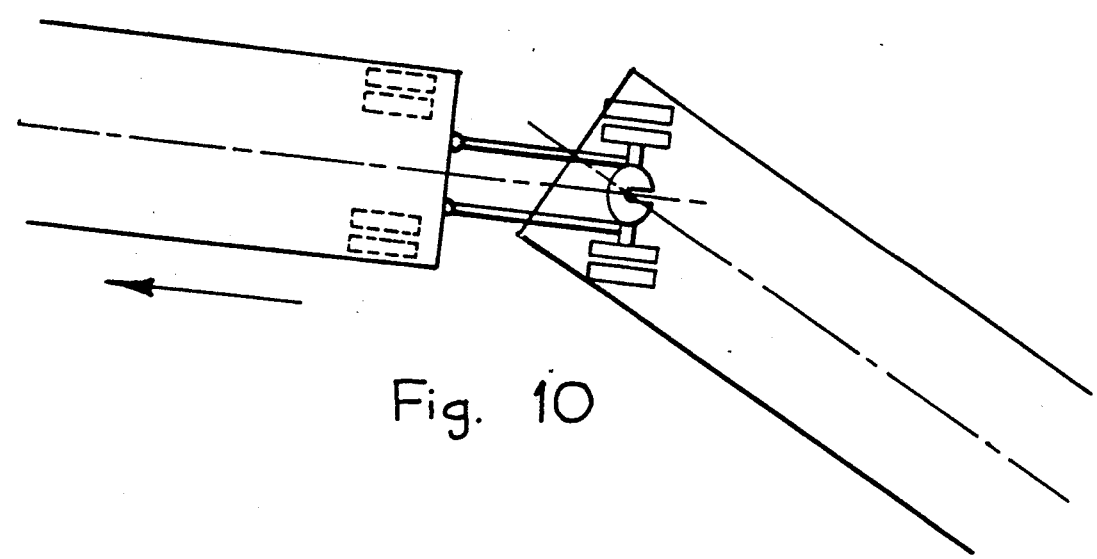
FIG. 10 Shows a plan view of a B train during a turn.
Figure 11:
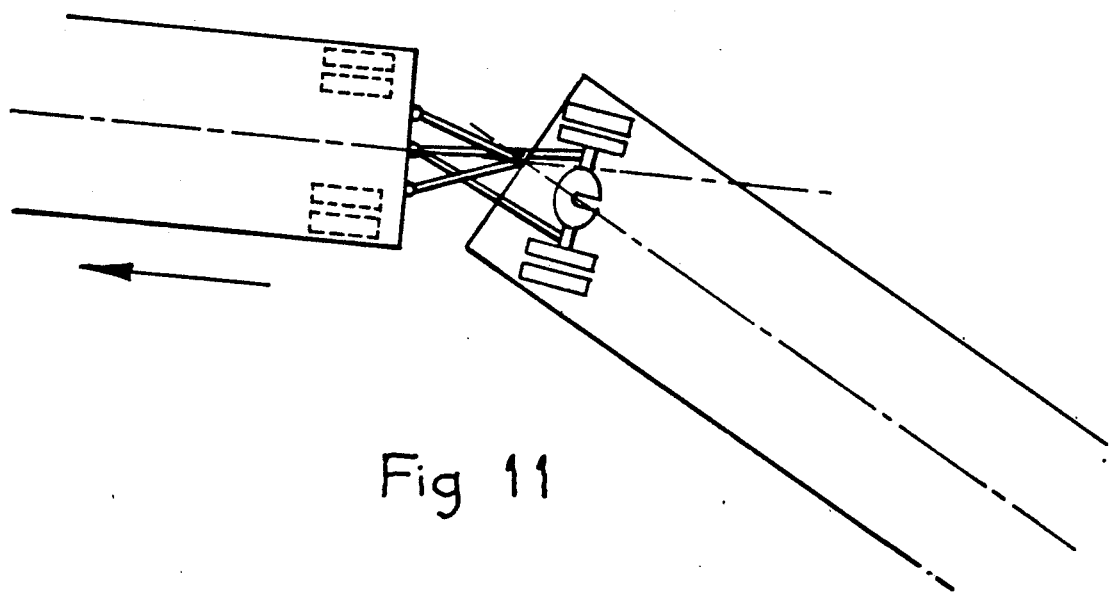
FIG. 11 Shows a plan view of the linked articulation combination vehicle in a turn.

FIG. 8 shows the assembled components of the present invention LA system. The only numbered item not shown on previous drawings is the second trailer's landing gear (43), a heavy duty jacking system typical of the industry.

DETAILED DESCRIPTION OF THE INVENTION, CONTINUED

Operation and Function

Firstly, as mentioned above, the roadspeed operation and function of the invention are virtually identical to present LA systems. Low speed maneuvering at sharp turning angles will not vary enough from present LA systems for drivers or onlookers to detect any difference. This section will concentrate on the simplified hook up procedure possible with the preferred form of the invention. Some additional structure will be described and some previously presented structure will be further clarified.

Consider now a double trailer truck consisting of a road tractor, a leading semi-trailer, the dolly and tow bar of the present invention, and a following or second trailer. At the start of the connection process the second trailer is connected to the dolly and the area in front of the dolly is clear. The road tractor and first trailer (perhaps having finished unloading and/or loading) are now moved to a position in front of the second trailer. The steering tongue of the dolly (46) is probably already depressed below the altitude of the guiding assembly (30) from prior disconnection. If not, the rear portion of the dolly behind the axle can be jacked upward to lower the steering tongue. Another method would be to raise the front of the entire second trailer with the landing gear (43). With the dolly tongue at a slightly lower altitude than the guiding assembly, the front trailer is backed over the working length of the steering tongue. The guiding assembly (30) should be above the working length portion of the tubular tongue (46). When the dolly tongue is raised (by lowering the second trailer landing gear (43) or lowering the rear portion of dolly (44)), said tongue will most likely not be exactly under the jaws (34) of the guiding assembly (30). The tapered shape at the bottom of guiding assembly (30) and the guiding rails (32a) and (32b) will assist the mating of tubular section (46) and the jaws (34). The dolly tongue is pulled laterally and the negative tongue weight will work in conjunction with the shape of the guiding assembly (30) to snap the tongue into the jaws (34).

The road tractor, the first trailer and the partially coupled second trailer are now driven forward. The forward collar of tongue (46) will not pass the jaws (34) so the second trailer is thus temporarily connected. When the combination vehicle has been driven far enough to align exactly the front of the second trailer with the body of the first trailer, the tractor is gently stopped. It is relatively easy to make this alignment as the sightlines from the tractor's rear view mirrors go along the body of the first trailer. The two trailers do not have to be in exact line.

Next the tow bar is fitted to the front trailer. While it is perhaps possible for a single man to fit the tow bar, a divot crane (80) fitted into a socket (82) on the leading trailer (27) makes the operation easier. The divot crane is of value also in supporting the rear end of the tow bar temporarily. When the two trailers are separated by the maximum distance allowed by the front collar (47) acting against the guiding assembly (30), the rear draft eye of the tow bar should only be a very short distance ahead of the pintle hook (59) or (72). The rear of the tow bar is supported by the divot crane or other means at the correct altitude to mate with the pintle hook (59) or (72). The tractor and lead trailer are then backed to engage the draft eye (26) with the pintle hook at the front of the second trailer. Presuming the front of the second trailer was lined up well with the body of the first trailer, the pintle hook will, in fact, lock around the draft eye. After the divot crane is removed from its socket and stowed, and the air lines and electrical connections made, the combination vehicle is ready for road travel.

VARIATIONS ON THE INVENTION AND CONCLUSIONS

Several specific varialtions of the invention have been described above. These variations have use primarily with double trailers or a straight truck and full trailer where the body overhang of the rear axle of the truck is not large. For full trailers pulled by straight trucks with a large overhang such as the well known fuel delivery system called west coast tankers, a LA system based on the invention is possible.

As already mentioned, the relationship of the three yaw articulation points (second trailer king pin, articulation point at rear of tow bar, and the front of the dolly tongue) determines how true the dolly axle tracks with out side slipping. It is a matter of fortune that the ideal points work out so appropriatly for typical trailers used in doubles. For leading vehicles such as the afore mentioned straight truck of the west coast tanker or the lead trailer of a 'Rocky Mountain double' seen often in Canada, these yaw articulation points will be different relative to body structure. Computer modeling and or road testing should be done with any high overhang leading vehicles as this form does not translate so directly to the present practice LA systems.

The main articulation point between the body structure of a full trailer and a high overhang lead vehicle would lie nearer the rear body structure of that tow vehicle than the front of the full trailer. This would call for an 'A' frame tow bar with the apex forward with yaw articulation at the rear of the overhanging body structure. The telescoping dolly tongue should extend into the unused space beneath the overhanging to a guiding assembly as (30) close behind the tow vehicle's reap axle.

It is possible that the LA of the present invention may be adapted to the typical farm trailers. When this kind of trailer is seen in loaded pairs, a maximum speed of about 15 mph is usual. Even so, overturning and grain spills are common.

As the form and structure of the invention applied to lead vehicles with large overhang and to farm type trailers is different enough to require many more drawings and claims, no drawings or claims are offered at this time on these variations of the invention.

Other variations of the invention using the principles outlined here should occur to those skilled in the art.

I claim:
1. In combination:
  a  a leading unit,
  b  a following full trailer, axes comprising a vertical yaw axis, a horizontal transversely extending pitch axis, and a horizontal longitudinally extending roll axis,
  c  connection means between said leading unit and said full trailer, comprising
  d  a tow bar having an articulated connection about the pitch axis to said leading unit, and
  e  said tow bar having pivotal attachment to the front body structure of said full trailer,
  f  said pivotal attachment having articulation in the yaw, pitch and roll axes,
  g  a steering axle assembly supporting the front portion of said full trailer,
  h  said steering axle assembly comprising at least a steering tongue and steerable wheels,
  i  location means for said steering tongue at substantially the rear of said leading unit for lateral and vertical position but allowing for longitudinal movement,
  j  said location means also allowing articulation of said steering tongue in yaw and pitch, whereby
  k  said leading unit and said following full trailer are connected in a linked articulation geometry.

2. In combination with claim 1, wherein: a said tow bar is articulated at the connection to said leading unit about a pitch axis.

3. In combination with claim 1, wherein: a the pivotal attachment of said tow bar to the said body structure of said full trailer is articulated in yaw and pitch but not in roll.

4. In combination:
  a  a leading unit,
  b  a following full trailer, axes comprising a vertical yaw axis, a horizontal transversely extending pitch axis, and a horizontal longitudinally extending roll axis,
  c  connection means between said leading unit and said full trailer, comprising
  d  a tow bar having articulated connection about the pitch axis to said leading unit,
  e  said tow bar having pivotal attachment to the front body structure of said full trailer,
  f  said pivotal attachment having articulation in the yaw, pitch and roll axes,
  g  a steering axle assembly supporting the front portion of said full trailer,
  h  said steering axle assembly comprising at least a steering tongue and steerable wheels,
  i  coupling means for attaching said steering tongue to substantially the rearmost end of said leading unit allowing articulation in pitch and yaw axes,
  j  said steering tongue incorporating a telescoping portion between said coupling means and said steerable wheels, whereby
  k  said leading unit and said full trailer are interconnected in linked articulation geometry.

* * * * *